(No Model.) 3 Sheets—Sheet 1.

W. L. CROWSON.
Cotton Gin Feeder.

No. 235,414. Patented Dec. 14, 1880.

Attest:
Charles Pickles
Geo. H. Knight

Inventor:
William L. Crowson
By Knight Bro.
Attys.

(No Model.) W. L. CROWSON. 3 Sheets—Sheet 2.
Cotton Gin Feeder.
No. 235,414. Patented Dec. 14, 1880.
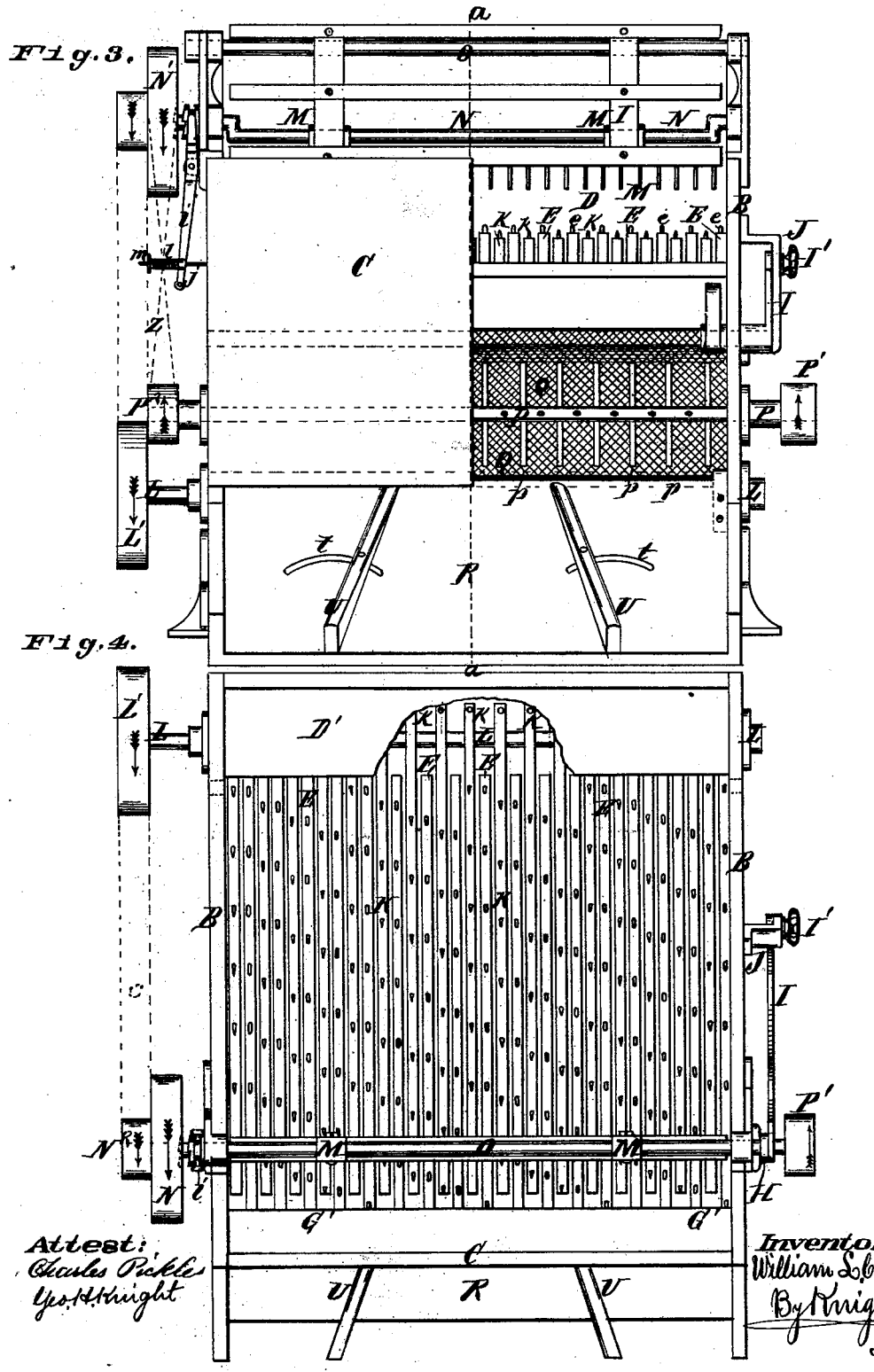

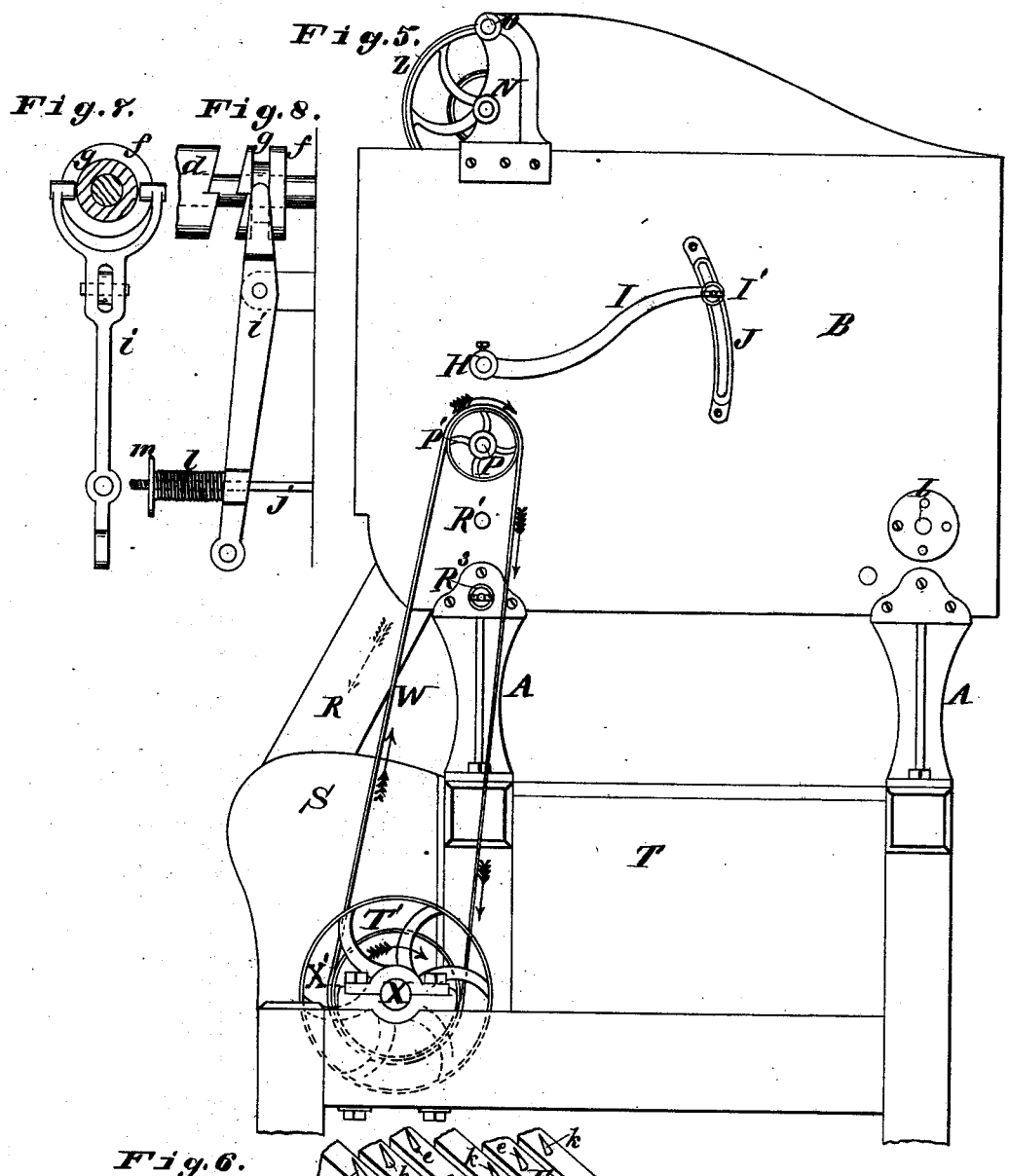

UNITED STATES PATENT OFFICE.

WILLIAM L. CROWSON, OF ST. LOUIS, MISSOURI.

COTTON-GIN FEEDER.

SPECIFICATION forming part of Letters Patent No. 235,414, dated December 14, 1880.

Application filed June 30, 1880. (No model.)

*To all whom it may concern:*

Figure 1:
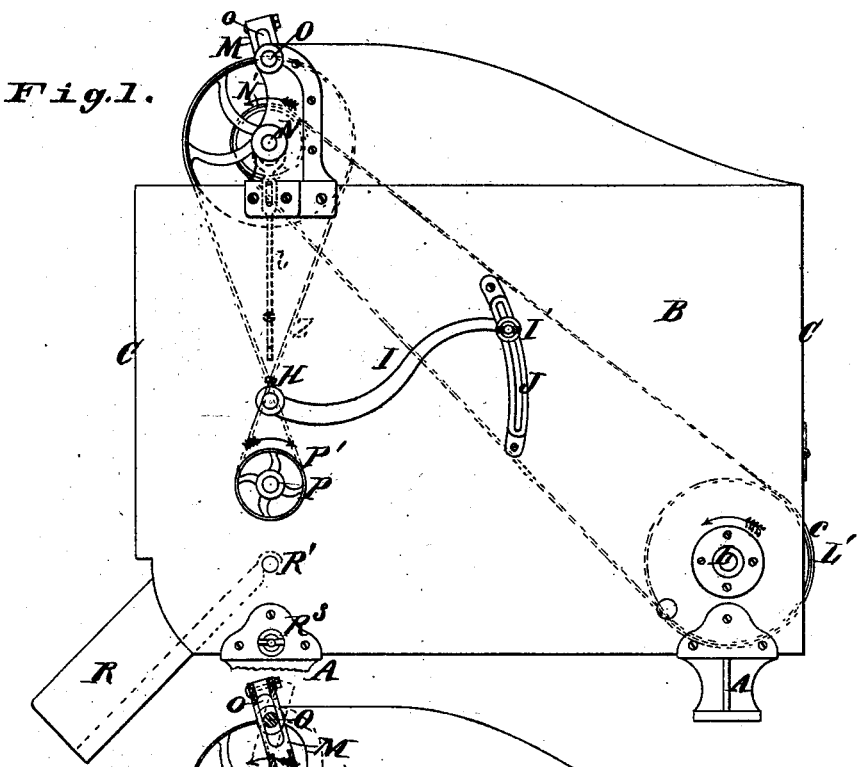
Figure 2:
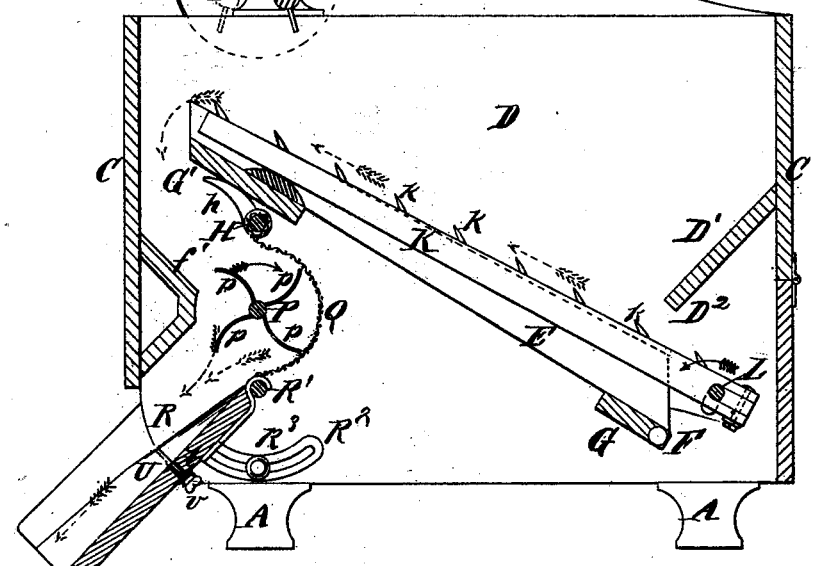

Be it known that I, WILLIAM L. CROWSON, of the city of St. Louis, in the State of Missouri, have invented a certain new and useful Improvement in Cotton-Gin Feeders, of which the following is a full, clear, and exact description, reference being had to the accompanying drawings, forming part of this specification.
In the drawings, Figure 1 is a side elevation, the dotted lines showing the banding, gearing, &c., of the opposite side to that which is here presented. Fig. 2 is a longitudinal section at $a\ a$, Fig. 3. Fig. 3 is a front elevation, with part of the front covering of the machine removed, showing the interior as seen from the front, or part where the feeder discharges the cotton. Fig. 4 is a top or plan view. Fig. 5 is a side elevation of the feeder and the upper portion of a cotton-gin, showing the manner of attachment. Fig. 6 is an enlarged detail perspective view, showing the relative position of the stationary and movable feed-bars. Figs. 7 and 8 are enlarged details of the clutch-gear, Fig. 7 being a section at $b\ b$, Fig. 8.

The object of this invention is to provide for the cotton-gin in general use a cheaper and more accurate automatic cotton-gin feeder, and one that shall be more easily regulated to suit any cotton-gin and all kinds of cotton than any other cotton-gin feeder in use.

The nature of the invention is defined by the claims.

A A are the legs, which stand upon the frame of the cotton-gin. (See Fig. 5.) The feeder has close sides B and ends C. Its bottom is open for the most part, and in its top is a large hopper or cotton-box, D, to receive the cotton. The bottom of the hopper consists of a number of bars, E, inclining upward toward the front or discharging end, and supplied with teeth $e$, "raking," as shown, so as to prevent the backward movement of the cotton, but allow its forward movement upward on the bars. These bars are supported at the lower end by a horizontal rod or bar, F, on which they may be adjusted as a pivot in changing their inclination to vary the feed according to the condition of the cotton. The bars E are fixed together at the lower end and the upper end by cross-bars G G'.

Beneath the upper ends of the bars E is a transverse shaft, H, carrying one or more cams, $h$, bearing against the under side of the cross-bar G', and thus supporting the upper end of the hopper-bottom. As the shaft H is turned the cams $h$ are raised or lowered, and the inclination of the hopper-bottom is changed. The shaft H carries an adjusting-arm, I, whose end carries a set-screw with a hand-nut, I', the screw being adjustable in a slotted bracket, J, at the side of the case. The cotton is caused to travel up the bars E by the action of the reciprocating bars K, parallel to and alternating with the bars E. These bars rest at the upper ends upon the cross-bar G', and at the lower ends are supported on a crank-shaft, L, which passes through them and gives a revolving movement to the lower ends of the bars K. The vertical movement decreases toward the point of support upon the bar G', while the endwise movement, of course, is the same from end to end. The bars K are armed with teeth $k$, similar to the teeth $e$. The teeth $k$ cause the upward and forward movement of the cotton in their forward movement, and in the back movement pass freely beneath the cotton, which is supported on the teeth $e$ of the fixed bars E. The crank-shaft L rotates in the direction shown by the arrows, so that the lower ends of the bars K will be lifted when moving upward and forward, and will be depressed when moving backward, thus forcibly engaging the cotton in the forward stroke and releasing it on the back stroke.

D' is an inclined board, forming part of the rear end of the hopper D, and whose lower end is a little distance from the top of the feed-bars E and K, so that gravel and other objectionable things in the cotton may escape through the aperture $D^2$ as they drop from the roll of cotton turning in the hopper, (under the influence of the feed-bars E.)

Above the upper end of the hopper-bottom is a reciprocating rake, M, hung upon a crank-shaft, N, rotating in the direction shown by the arrows. The purpose of the rake is to prevent the passage of too great a quantity of cotton, and for this purpose its backward movement is made when in its lower position—that is, when the crank is making its lower semi-revolution—and the return or forward and inactive movement of the rake is made when in its upper position. When it is in its upper position, and consequently in its return movement, the rake will not engage the cotton. The rake oscillates on a transverse rod or bar, O, passing through slots $o$ in the vertical bars of the head, said slots permitting the vertical movements induced by the crank-shaft N.

The feed of the cotton is regulated by the position of the upper end of the hopper-bottom. This end is raised to decrease the feed by making the inclination of the bars E and K steeper, and by lessening the size of the passage between the hopper-bottom and the rake. When the cotton leaves the hopper or box D it falls upon the arms $p$ of a rotary beater having a shaft, P, and turning in a case whose inner side, Q, is of wire-work, to allow the escape of dust and other impurities. The main purpose of the beater is to thoroughly lighten up the cotton before entering the gin. From the beater the cotton falls into the chute R, leading to hopper S of the cotton-gin T. The bottom of the chute has adjustable inclined guides U, arranged to carry the cotton outward and discharge a greater amount into the ends of the roll, thus condensing its ends and preventing its breaking. The guides are supported on pivots $u$, and held in position by bolts V, passing through slots $t$ in the chute-bottom, and carrying set-nuts $r$. The chute R is adjustable upon a rod, R', and is held in position by a slotted bracket, R², through which passes a set-screw, R³, to lock the chute in position.

The feeder may receive motion by means of a belt, W, upon a pulley, X', on the saw-shaft X of the gin, and passing over a pulley, P', upon the shaft P of the beater, from there by a cross-belt, Z, passing from pulley P² to the pulley N' upon the crank-shaft N of the rake; thence, by a pulley, N², upon said shaft and belt $c$, to a pulley, L', on the crank-shaft L.

The clutch-pulley N' turns freely upon the shaft N, except when clutched thereto by the spring-clutch. (Shown most fully in Figs. 7 and 8.) The clutch consists of a ratchet-hub, $d$, upon the pulley, which engages with a ratchet-collar, $f$, sliding endwise on the shaft P, and turning the shaft by means of a diametric pin passing through a slot in the shaft, or by a feather-key or other well-known means of connection for the said purpose. The clutch-collar has the usual circumferential groove $g$, taking the toes of a forked lever, $i$, by which it is moved upon the shaft to engage or disengage the members $d$ and $f$ of the clutch. The lever is perforated to allow the passage of a horizontal fixed rod, $j$, carrying a spring, $l$.

$m$ is a hand-nut screwing upon the end of the rod $j$ and pressing the spring $l$ against the outer side of the lever $i$. The spring $l$ forces the clutch into engagement and holds the parts in this position. Thus it will be seen that to stop the motion of the feeder it is only needed to pull out the end of the lever $i$, thus opening the clutch, and that as soon as the lever is released the spring $l$ will close the clutch, and the feeder will be put in motion. The lever (to open the clutch) may be drawn out by a cord or cords extending to any part of the building.

I claim as my invention—

1. The combination, with the inclined bars E and K, of the rake M, having a compound oscillatory and revolutionary motion, substantially as set forth.

2. The chute R, having adjustable guides U, substantially as and for the purpose set forth.

3. The inclined bars E and K, with hinge-support at the lower end and adjustable support at the upper end, for the purpose set forth.

WILLIAM L. CROWSON.

Witnesses:
 SAML. KNIGHT,
 GEO. H. KNIGHT.